United States Patent
Lee et al.

(10) Patent No.: US 9,695,532 B2
(45) Date of Patent: Jul. 4, 2017

(54) MATTE FILM AND METHOD OF MANUFACTURING THE SAME

(71) Applicant: AMOGREENTECH CO., LTD., Gyeonggi-do (KR)

(72) Inventors: Seung Hoon Lee, Gyeonggi-do (KR); Yong Sik Jung, Gyeonggi-do (KR); Yun Mi So, Daejeon (KR); In Yong Seo, Seoul (KR)

(73) Assignee: Amogreentech Co., Ltd., Gyeonggi-Do (KR)

( * ) Notice: Subject to any disclaimer, the term of this patent is extended or adjusted under 35 U.S.C. 154(b) by 314 days.

(21) Appl. No.: 14/382,598

(22) PCT Filed: Feb. 22, 2013

(86) PCT No.: PCT/KR2013/001448
§ 371 (c)(1),
(2) Date: Sep. 3, 2014

(87) PCT Pub. No.: WO2013/133558
PCT Pub. Date: Sep. 12, 2013

(65) Prior Publication Data
US 2015/0030828 A1    Jan. 29, 2015

(30) Foreign Application Priority Data
Mar. 6, 2012 (KR) ........................ 10-2012-0022672

(51) Int. Cl.
*D04H 1/72* (2012.01)
*B05D 5/02* (2006.01)
(Continued)

(52) U.S. Cl.
CPC ................. *D04H 1/72* (2013.01); *B05D 5/02* (2013.01); *B32B 5/024* (2013.01); *B32B 5/26* (2013.01);
(Continued)

(58) Field of Classification Search
None
See application file for complete search history.

(56) References Cited

U.S. PATENT DOCUMENTS 4,437,408 A * 3/1984 Arkans ................ B41F 17/003
101/483
2006/0035060 A1    2/2006 Koyama et al.

FOREIGN PATENT DOCUMENTS

KR       1020050019602 A         3/2005
KR       WO 2007029913 A1 *      3/2007 ............. A61L 31/10
(Continued)

OTHER PUBLICATIONS

[NPL-1] "Components of printing inks"; Nov. 27, 1999. <http://www.hdm-stuttgart.de/projekte/printing-inks/p_compo0.htm>.*

*Primary Examiner* — David Sample
*Assistant Examiner* — Donald M Flores, Jr.
(74) *Attorney, Agent, or Firm* — Rosenberg, Klein & Lee

(57) ABSTRACT

Provided is matte film including: a film layer that is formed in a nano-web shape by electrospinning a polymer material; an ink layer that is coated on one surface of the film layer; and an adhesive layer that is laminated on the other surface of the film layer through electrospinning. Since the film layer is formed in a nano-web shape so that fiber strands are accumulated, the matte film can be thinly produced and have a non-glossy function of performing scattered reflection of light and a fingerprint-preventive function of making fingerprints imprinted. Further, the surface strength of the matte film can be reinforced.

11 Claims, 2 Drawing Sheets

(51) Int. Cl.
*D04H 13/00* (2006.01)
*D06M 23/00* (2006.01)
*D04H 1/728* (2012.01)
*D04H 1/724* (2012.01)
*D04H 1/4358* (2012.01)
*B32B 5/02* (2006.01)
*B32B 5/26* (2006.01)
*B32B 7/06* (2006.01)
*B32B 7/12* (2006.01)

(52) U.S. Cl.
CPC ............... *B32B 7/06* (2013.01); *B32B 7/12* (2013.01); *D04H 1/4358* (2013.01); *D04H 1/724* (2013.01); *D04H 1/728* (2013.01); *D04H 13/006* (2013.01); *D06M 23/00* (2013.01); *B05D 2256/00* (2013.01); *B05D 2503/00* (2013.01); *B32B 2255/02* (2013.01); *B32B 2262/0292* (2013.01); *B32B 2307/4023* (2013.01); *B32B 2307/584* (2013.01); *B32B 2307/748* (2013.01); *B32B 2439/70* (2013.01); *B32B 2554/00* (2013.01); *Y10T 428/24942* (2015.01); *Y10T 442/674* (2015.04); *Y10T 442/681* (2015.04)

(56) References Cited

FOREIGN PATENT DOCUMENTS

| KR | 1020090056103 A | 3/2009 |
| KR | 1020010009327 A | 5/2011 |
| KR | 1020110047340 A | 9/2011 |
| WO | WO2007029913 A1 | 3/2007 |

\* cited by examiner

MATTE FILM AND METHOD OF MANUFACTURING THE SAME

TECHNICAL FIELD

The present invention relates to a matte film having a non-glossy function of performing a scattered reflection of external light, as well as a fingerprint-preventive function of preventing a fingerprint from getting imprinted, and a method of manufacturing the same.

BACKGROUND ART

In general, matte films, that is, non-glossy films reflect external light irregularly, to thus prevent fatigue of the eyes and exposure of packaged contents shown in a glossy film, and to thereby give elegance of products. Therefore, in recent years, matte films are being used in food packaging, book covers, shopping bags, or labels, and purposes of use also increase gradually.

In particular, matte films are attached to surfaces of NFC (Near Field Communication) antennas which are mounted inside portable electronic devices and can be also used as protective films of the NFC antennas.

The previously used matte films have high light reflection and transparency performance and low density of non-glossy surfaces, to thereby cause external appearance of the films to be coarse. Therefore, there has been a need for development of matte films so that light reflection and transparency performance is lowered, to meet needs of users, and density of non-glossy surfaces is improved to heighten elegance of the external appearance of the films.

As disclosed in Korean Patent Registration No. 10-0370265 (16 Jan. 2003), the conventional matte film is configured to include a composite resin composition that is manufactured by mixing peroxide of 0.001 to 0.1 parts by weight with respect to a base resin composition of 100 parts by weight composed of homo polypropylene of 30 to 70% by weight and high-density polyethylene 70 to 30% by weight, either directly or in a master batch form, and adding an antioxidant of 0.001 to 0.5 parts by weight and a lubricant, from 0.001 to 0.2 parts by weight, and is prepared by melting and extruding the composite resin composition for use in laminated matte films to thus be stacked on a polypropylene film surface to a predetermined thickness.

However, it is difficult to make thickness of the matte film slimmed, since the conventional matte film is prepared by melting and extruding the composite resin composition to thus be stacked on a base polypropylene film surface, and it is difficult to freely adjust the thickness of the matte film. Further, the manufacturing cost is increased.

DISCLOSURE

Technical Problem

To solve the above problems or defects, it is an object of the present invention to provide a matte film and a method of manufacturing the same, in which ultra-fine fiber strands are made by electrospinning a polymer material, and the ultra-fine fiber strands are accumulated to thus be formed in a nano-web shape so as to be slimmed.

It is another object of the present invention to provide a matte film having a non-glossy function of performing a scattered reflection of external light, as well as a fingerprint-preventive function of preventing a fingerprint from getting imprinted, and a method of manufacturing the same.

It is still another object of the present invention to provide a matte film and a method of manufacturing the same, in which the matte film can be made in various colors by coating an ink layer on a surface of a film layer, and a surface strength of the matte film is strengthened to have a scratch resistance.

The technical solutions in the present invention are not limited to the above-mentioned technical solutions and the other technical solutions that are not mentioned here will become understood apparently by those skilled in the art from the following description of the invention.

Technical Solution

To accomplish the above and other objects of the present invention, according to an aspect of the present invention, there is provided a matte film comprising: a film layer that is formed in a nano-web shape by electrospinning a polymer material; an ink layer that is coated on one surface of the film layer; and an adhesive layer that is laminated on the other surface of the film layer through electrospinning.

According to another aspect of the present invention, there is provided a method of manufacturing a matte film comprising the steps of: forming a film layer in a nano-web shape by electrospinning a polymer material; forming an adhesive layer in a nano-web shape by electrospinning an adhesive material on the other surface of the film layer; and coating an ink layer on one surface of the film layer.

Advantageous Effects

As described above, the present invention provides a matte film and a method of manufacturing the same, in which a polymer material is made into ultra-fine nano-web strands by an electrospinning method, and the ultra-fine nano-web strands are accumulated to thus be formed in a nano-web shape and to thus make the matte film at a desired thickness, in particular, so as to be slimmed.

In addition, the present invention provides a matte film on a surface of which irregular unevenness is formed, to thus provide an advantage of having a non-glossy function of performing a scattered reflection of external light, as well as a fingerprint-preventive function of preventing a fingerprint from getting imprinted.

Further, the present invention provides a matte film which can be made in various colors by coating an ink layer on a surface of a film layer, and which has a scratch resistance by strengthening a surface strength of the matte film.

BEST MODE

Figure 1:
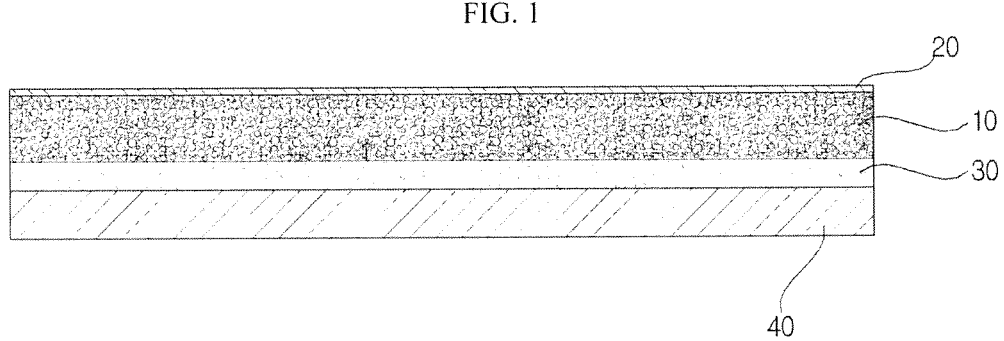
FIG. 1 is a cross-sectional view of a matte film according to a first embodiment of the present invention.

The above and other objects, features, and advantages of the present invention can be appreciated by the following description and will be understood more clearly by embodiments of the present invention. In addition, it will be appreciated that the objects and advantages of the present invention will be easily realized by features shown in the appended patent claims, and combinations thereof. Accordingly, the technical spirit of the present invention can be easily implemented by one of ordinary skill in the art.

Further, if it is determined that the detailed description of the known art related to the present invention makes the gist of the present invention unnecessarily obscure, a detailed description thereof will be omitted.

Embodiments of the present invention will be described in detail with reference to the accompanying drawings. The size or shape of the components illustrated in the drawings in this case may be shown to be exaggerated for convenience of illustration and clarity. In addition, specifically defined terms may be changed according to the intention of users or operators or practices in consideration of the configuration and operation of the present invention. The definition of the terms should be given according to the contents throughout the present specification.

Figure 2:
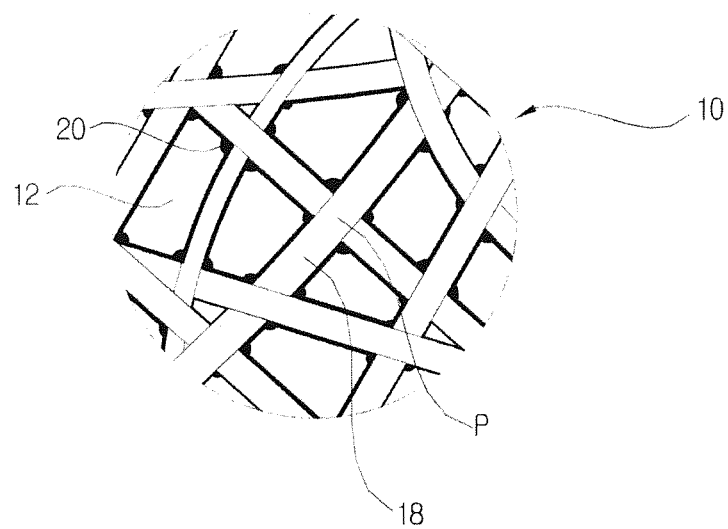
FIG. 2 is an enlarged view of the matte film according to the first embodiment of the present invention.

FIG. 1 is a cross-sectional view of a matte film according to a first embodiment of the present invention, and FIG. 2 is an enlarged view of the matte film according to the first embodiment of the present invention.

Referring to FIGS. 1 and 2, a matte film according to a first embodiment of the present invention includes: a film layer 10 in which ultra-fine fiber strands are made by electrospinning a polymer material, and the ultra-fine fiber strands are accumulated to thus be formed in a nano-web shape; an ink layer 20 that is coated on one surface of the film layer 10; and an adhesive layer 30 that is laminated on the other surface of the film layer 10.

The film layer 10 is fabricated in a nano-web shape having a large number of pores 12 by making ultra-fine fiber strands 18 through a spinning method of a polymer material and accumulating the ultra-fine fiber strands 18, and thus is formed to have an irregular surface.

The film layer 10 is made in a non-woven fabric form by a spinning method and thus is formed to have an irregular concave-convex surface, in which light gets scattered reflection from the irregular concave-convex surface, to thereby make a matte effect and exert a fingerprint-preventive effect.

The diameter of one of the fiber strands 18 is preferably in a range of 0.1-3.0 μm.

Here, the spinning method that is applicable in this invention may be any one of general electrospinning, air-electrospinning (AES), electrospray, electrobrown spinning, centrifugal electrospinning, and flash-electrospinning.

That is, the film layer 10 and the adhesive layer 30 may be formed by using any spinning method among the spinning methods by which the film layer 10 and the adhesive layer 30 can be made in a form where the ultra-fine fiber strands are accumulated.

The polymer material that is used to make the film layer 10 may be, for example, polyvinylidene fluoride (PVDF), poly (vinylidene fluoride-co-hexafluoropropylene), perfluoropolymer, polyvinyl chloride or polyvinylidene chloride, and copolymers thereof, a polyethylene glycol derivative comprising polyethylene glycol dialkyl ether and polyethylene glycol dialkyl ester, poly-oxide comprising poly (oxymethylene-oligo-oxyethylene), polyethylene oxide and polypropylene oxide, polyacrylonitrile copolymer comprising polyvinyl acetate, poly (vinylpyrrolidone-vinyl acetate), polystyrene and polystyrene acrylonitrile copolymer, and polyacrylonitrile methyl methacrylate copolymer, polymethyl methacrylate and polymethylmethacrylate copolymer, and mixtures thereof.

Since the film layer 10 is fabricated by using the spinning method, thickness of the film layer 10 is determined according to a dose of the spun polymer material. Thus, the film layer 10 may be advantageously made in a desired thickness. In other words, it is possible to slim the thickness of the film layer 10 when a dose of the spun polymer material is made small. In addition, since a dose of the spun polymer material is small, the manufacturing cost can be reduced so much.

In this way, since the film layer 10 may be fabricated by an electrospinning method, the thickness of the film layer 10 can be freely adjusted according to a dose of the electrospun polymer material. Further, it is possible to manufacture a thinner film than conventional matte films.

The ink layer 20 is formed by mixing an ink, a binder, and a solvent at a predetermined ratio and coating the mixture on a surface of the film layer 10. Here, gravure printing, coating, spray, and the like may be used as the coating method of the ink layer 20.

A black ink or a color ink can be used as the ink, and thus the matte film can be realized in various colors. In addition, a binder to enhance the strength of the film layer 10 is included in the ink layer 20, and thus the surface strength of the film layer 10 is reinforced to thereby have scratch-preventive performance.

Here, when the ink layer 20 is made thin, a non-glossy function is performed, but when the ink layer 20 is made thick, a glossy function is performed to thereby produce a glossy film.

That is, when the ink layer 20 is made thick, a glossy and fingerprint-preventive film having a glossy function and a fingerprint-preventive function is produced.

As shown in FIG. 2, since the film layer 10 is formed in a nano-web shape in which ultrafine fiber strands 18 prepared by the electrospinning method are accumulated, pores 12 are formed between the ultrafine fiber strands 18, and the ink layer 20 is surrounded by and coated on the outer surfaces of the fiber strands to thus reinforce strength of the fiber strands 18.

Furthermore, the ink layer 20 is coated at points P where the fiber strands 18 cross each other, and thus serves to secure between the fiber strands 18, thereby strengthening the strength of the film layer 10. Thus, because of the ink layer 20, the strength of the film layer 10 is reinforced, and the surface strength of the matter film increases, to thereby have a scratch-preventive function.

In this way, the ink layer 20 is coated on the surface of the film layer 10 in a nano-web shape, to thereby enable the matte film according to the present invention to perform a non-glossy function and a fingerprint-preventive function simultaneously.

The adhesive layer 30 is prepared in the same electrospinning method as the method of preparing the film layer 10. In other words, the adhesive layer 30 is formed by making an adhesive material of a viscosity suitable for electrospinning by a mixture of an adhesive and a solvent, and spinning the adhesive material on the other surface of the film layer 10 by the electrospinning method.

Here, the thickness of the adhesive layer 30 is determined in accordance with a dose of the spun adhesive material. Therefore, it is possible to make the thickness of the adhesive layer 30 at a desired thickness.

Meanwhile, the adhesive layer 30 is formed by spinning an adhesive material in the form of ultra-fine fiber strands to then be adhered on the surface of the film layer 10, in which the adhesive material is introduced into the pores 12 of the film layer 10 and thus an adhesive strength between the film layer 10 and the adhesive layer 30 is increased. Thus, when the matte film is separated from a product where the matte film has been applied, a problem of making the product dirty due to the adhesive layer remaining on the surface of the product can be solved.

In addition, as the adhesive layer 30 is introduced into the pores 12 of the film layer 10, a dose of the adhesive can be increased. Accordingly, when an identical thickness of the adhesive layer 30 is formed, the adhesive strength can be increased.

A release film 40 to protect the adhesive layer 30 is attached to the surface of the adhesive layer 30.

In the first embodiment, the ink layer 20 is formed on only one surface of the film layer 10, and thus the structure with a non-glossy function and a fingerprint-preventive function at only one side of the film layer 10 has been described, but a structure with a non-glossy function and a fingerprint-preventive function at both sided of the film layer 10 can be applied to the matte film according to the present invention.

In other words, when a pair of the structures where the ink layer 20 is formed on the surface of the film layer 10 are cross-laminated, ink layers are provided on both sides of the film layer 10, to thereby prepare a two-sided non-glossy and fingerprint-preventive film.

Figure 3:
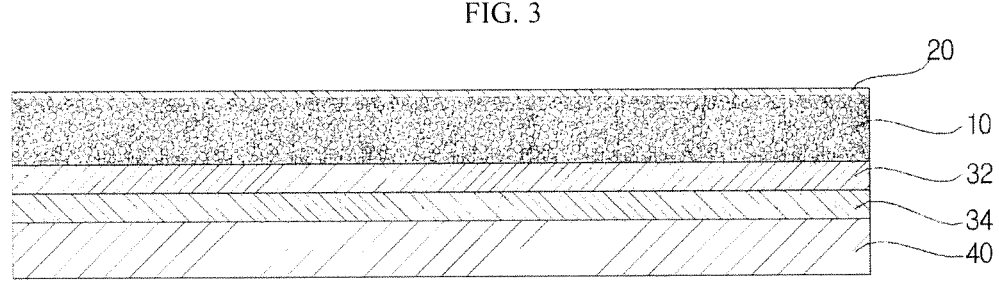
FIG. 3 is a cross-sectional view of a matte film according to a second embodiment of the present invention.

FIG. 3 is a cross-sectional view of a matte film according to a second embodiment of the present invention.

Referring to FIG. 3, the matte film according to the second embodiment of the present invention is used for a portion where strength of a film layer 10 is strongly required, and includes: the film layer 10 having a nano-web form of a predetermined thickness in which ultra-fine fibers are accumulated by a spinning method; a first adhesive layer 32 that is laminated on one surface of the film layer 10; a second adhesive layer 34 that is laminated on a surface of the first adhesive layer 32; and an ink layer 20 that is coated on the other surface of the film layer 10.

The first adhesive layer 32 has a high viscosity, and the second adhesive layer 34 has a relatively lower viscosity than the first adhesive layer 32.

In the case that a high viscosity of an adhesive layer is laminated on the surface of the film layer 10, a relatively small amount of an adhesive material is absorbed into the pores 12. Accordingly, the shape of the film layer 10 is easily maintained, and thus the strength of the film layer 10 can be made stronger.

Accordingly, the strength of the film layer 10 is reinforced by laminating a high viscosity of the first adhesive layer 32 on the surface of the film layer 10.

In addition, when the viscosity of the adhesive layer is high, the adhesive strength is reduced. In order to prevent the adhesive strength from decreasing, a low viscosity of the second adhesive layer 34 is laminated on the surface of the high viscosity of the first adhesive layer 32, to thus enhance the adhesive strength.

In the case of the matte film according to the second embodiment, the high viscosity of the first adhesive layer 32 is laminated on the surface of the film layer 10, to thus reinforce the strength of the film layer 10, and the low viscosity of the second adhesive layer 34 is laminated on the surface of the high viscosity of the first adhesive layer 32, to thus reinforce the adhesive strength.

Figure 4:
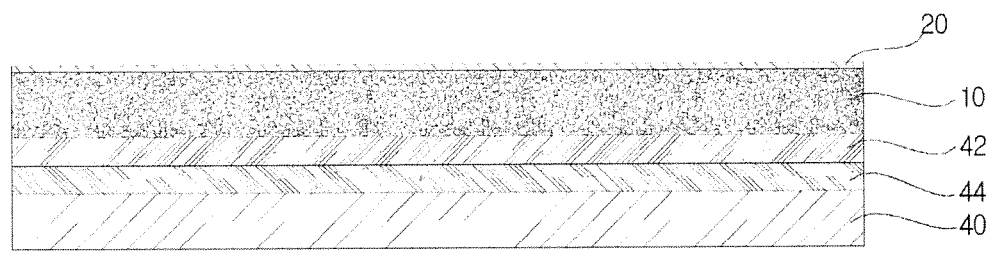
FIG. 4 is a cross-sectional view of a matte film according to a third embodiment of the present invention.

FIG. 4 is a cross-sectional view of a matte film according to a third embodiment of the present invention.

Referring to FIG. 4, the matte film according to the third embodiment of the present invention includes: a film layer 10 having a nano-web form of a predetermined thickness in which ultra-fine fibers are accumulated by a spinning method; a non-porous adhesive layer 42 that is laminated on a surface of the film layer 10; and an adhesive layer 44 that is laminated on a surface of the non-porous film layer 42.

The non-porous adhesive layer 42 is formed in a non-porous form having no pores without a separate heat treatment in which PU (Polyurethane) or TPU (Thermoplastic polyurethane) is melted in a solvent when a polymer material containing the PU or TPU is made into ultra-fine fiber strands by an electrospinning method and then ultra-fine fiber strands are accumulated.

That is, the non-porous adhesive layer 42 is formed in a non-porous form having no pores, in which PU or TPU is melted when an adhesive material containing a rubber component such as the PU or TPU that is melted in a solvent is used and electrospun.

When the non-porous adhesive layer 42 is laminated on the surface of the film layer 10, the adhesive material is not absorbed into pores formed in the film layer 10, to thus reinforce the strength of the film layer 10.

The adhesive layer 44 is formed of a low viscosity of the adhesive layer to improve an adhesive strength.

In this way, in the case of the matte film according to the second embodiment, the non-porous adhesive layer 42 is laminated between the film layer 10 and the adhesive layer 44, to thus prevent the adhesive material of the adhesive layer 44 from being absorbed into the pores of the film layer 10 and to thereby enhance the strength of the film layer 10.

Figure 5:
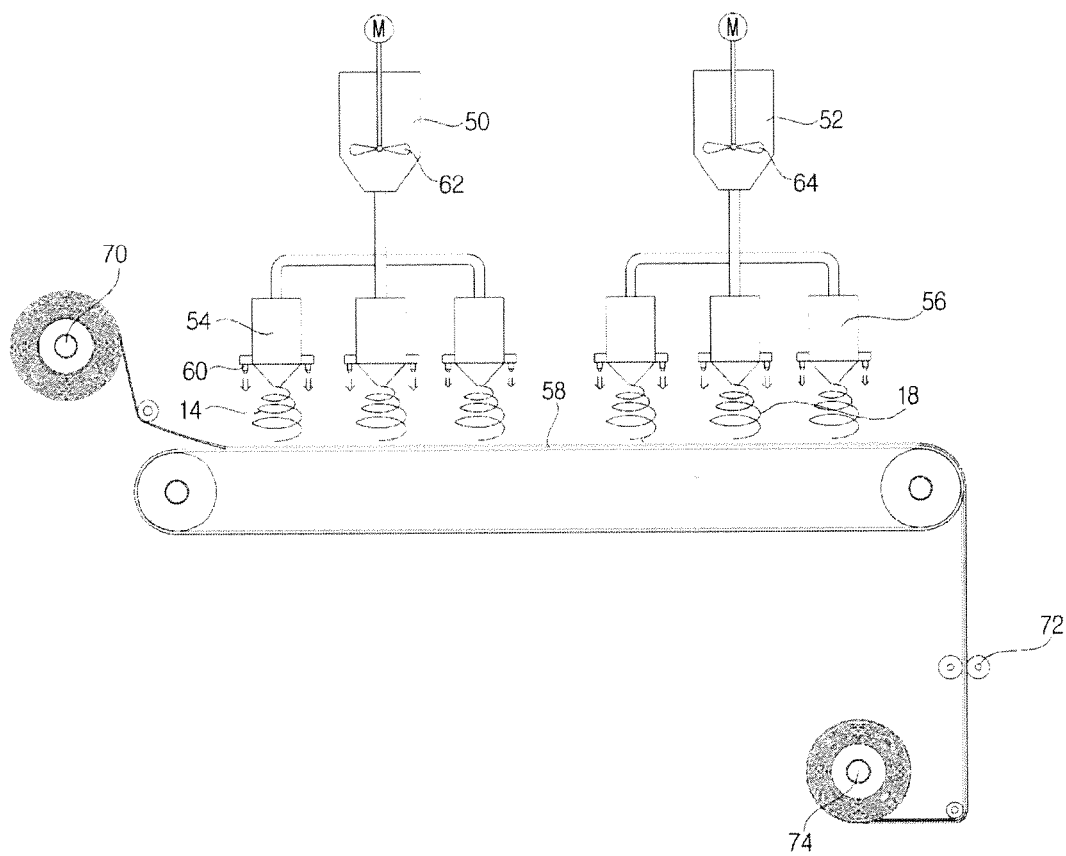
FIG. 5 is a block diagram of a configuration of an electrospinning apparatus for manufacturing a matte film according to the present invention.

FIG. 5 is a block diagram of a configuration of an electrospinning apparatus for manufacturing a matte film according to the present invention.

Referring to FIG. 5, the electrospinning apparatus according to the present invention includes: a first mixing tank 50 in which an adhesive material and a solvent are mixed and stored; a second mixing tank 52 in which a polymer material and a solvent are mixed and stored; a first spinning nozzle unit 54 that is connected to a high voltage generator and the first mixing tank 50, and spins ultra-fine fiber strands 14 to thus form an adhesive layer 30; a second spinning nozzle unit 56 that is connected to a high voltage generator and the second mixing tank 52, and spins ultra-fine fiber strands 18 to thus form a film layer 10; and a collector 58 in which the ultra-fine fiber strands 14 and 18 spun from the first and second spinning nozzle units 54 and 56.

The first mixing tank 50 is provided with a first agitator 62 that evenly mixes the adhesive material and the solvent and maintains a constant viscosity of the adhesive material, and the second mixing tank 52 is provided with a second agitator 64 that evenly mixes the polymer material and the solvent and maintains a constant viscosity of the polymer material.

The collector 58 collects the ultra-fine fiber strands spun from the first spinning nozzle unit 54 and the second spinning nozzle unit 56, and is formed of a conveyor, in which the adhesive layer 30 formed by the first spinning nozzle unit 54 is transferred to the second spinning nozzle unit 56, to thus laminate the film layer 10 on the surface of the adhesive layer 30.

A high voltage electrostatic force of 90 to 120 Kv is applied between the collector 58 and the spinning nozzle units 54 and 56, to thereby spin ultra-fine fiber strands 14 and 18.

Here, the first spinning nozzle unit 54 and the second spinning nozzle unit 56 include a plurality of spinning nozzles, respectively, in which the plurality of spinning nozzles may be arranged in sequence in a chamber or may be arranged in different chambers, respectively.

The plurality of spinning nozzles in the first spinning nozzle unit 54 and the second spinning nozzle unit 56 are provided with an air spray apparatus 60, respectively, to thereby spray air to the fiber strands 14 and 18 spun from the first spinning nozzle unit 54 and the second spinning nozzle unit 56, and to thus make the fiber strands 14 and 18 smoothly collected to the collector 58 without fluttering.

A release film roll 70 around which a release film 40 is wound is disposed in front of the collector 58, to thus feed the release film 40 to the collector 58.

A pressure roller 72 is provided at one side of the collector 58, in which the pressure roller 72 pressurizes the film layer 10 and the adhesive layer 30 to have a constant thickness. A film roll 74 is provided, around which the film layer 10 and the adhesive layer 30 pressurized via the pressure roller 72 are wound.

A process for producing a matte film by using an electrospinning apparatus as described above will be described as follows.

The release film 40 is supplied from release film roll 70 to the collector 58.

Then, a high voltage electrostatic force is applied between the collector 58 and the first spinning nozzle unit 54, and the adhesive material is made into ultra-fine fiber strands 14 by the first spinning nozzle unit 54 to then be spun to the top surface of the collector 58. As a result, the ultra-fine fiber strands 14 are collected onto the surface of the release film 40 to thus form the adhesive layer 30.

Here, when the first spinning nozzle unit 54 spins the fiber strands 14, the air spray apparatus 60 mounted in the first spinning nozzle unit 54 sprays air to the fiber strands 14, so that the fiber strands 14 can be collected and captured on the surface of the collector 58.

Then, when the adhesive layer 30 is completely manufactured, the collector 58 is driven so that the adhesive layer 30 is moved to the bottom of the second spinning nozzle unit 56, and when a high voltage electrostatic force is applied between the collector 58 and the second spinning nozzle unit 56, the polymer material is made into ultra-fine fiber strands 18 by the second spinning nozzle unit 56 to then be spun to the surface of the adhesive layer 30. As a result, the ultra-fine fiber strands 18 are collected onto the surface of the adhesive layer 30 to thus form the nano-web film layer 10.

Here, likewise, when the second spinning nozzle unit 56 spins the fiber strands 18, the air spray apparatus 60 mounted in the second spinning nozzle unit 56 sprays air to the fiber strands 18, so that the fiber strands 18 can be collected and captured on the surface of the adhesive layer 30.

In this way, the finished tape passes through the pressure roller 72, to then be pressurized into a predetermined thickness and to thus be wound on the film roll 74.

Then, when the ink layer 20 is coated on the surface of the film layer 10, the matte film is completely manufactured.

Here, the ink layer 20 is formed by mixing an ink, a binder, and a solvent at a predetermined ratio. Here, gravure printing, coating, spray, and the like may be used as the coating method of the ink layer 20.

As described above, the present invention has been described with respect to particularly preferred embodiments. However, the present invention is not limited to the above embodiments, and it is possible for one who has an ordinary skill in the art to make various modifications and variations, without departing off the spirit of the present invention. Thus, the protective scope of the present invention is not defined within the detailed description thereof but is defined by the claims to be described later and the technical spirit of the present invention.

INDUSTRIAL APPLICABILITY

Matte films according to the present invention are being used in food packaging, book covers, shopping bags, or labels. In particular, matte films are attached to surfaces of NFC (Near Field Communication) antennas which are mounted inside portable electronic devices and can be also used as protective films of the NFC antennas. Matte films according to the present invention can be thinly produced to thus enhance performance and to thereby be applicable in various fields.

The invention claimed is:

1. A matte film comprising:
    a film layer that is formed of nano-web of fiber strands made by a spinning method of a polymer material, the polymer material of the film layer being selected from the group consisting of polyvinylidene fluoride (PVDF), poly (vinylidene fluoride-co-hexafluoropropylene), perfluoropolymer, polyvinyl chloride, polyvinylidene chloride, copolymers of polyvinyl chloride or polyvinylidene, a polyethylene glycol derivative comprising polyethylene glycol dialkyl ether and polyethylene glycol dialkyl ester, poly-oxide comprising poly (oxymethylene-oligo-oxyethylene), polyethylene oxide and polypropylene oxide, polyvinyl acetate, poly(vinylpyrrolidone-vinyl acetate), polystyrene and polystyrene acrylonitrile copolymer, polyacrylonitrile copolymer comprising polyacrylonitrile methyl methacrylate copolymer, polymethyl methacrylate, polymethyl methacrylate copolymer, and mixtures thereof;
    an ink layer that is coated on one surface of the film layer; and
    an adhesive layer that is laminated on the other surface of the film layer through an electrospinning process.

2. The matte film of claim 1, wherein the spinning method is any one of electrospinning, air-electrospinning (AES), electrospray, electrobrown spinning, centrifugal electrospinning, and flash-electrospinning.

3. The matte film of claim 1, wherein irregular unevenness is formed on the surface of the film layer and thus the film layer has a non-glossy function of performing scattered reflection of light and a fingerprint-preventive function of making fingerprints imprinted.

4. The matte film of claim 1, wherein the ink layer is formed by mixing an ink, a binder, and a solvent, in which the ink is made of a black or color.

5. The matte film of claim 1, wherein the ink layer is coated on the outer surfaces of the fiber strands so as to be coated at points where the fiber strands cross each other to thus reinforce strength of the fiber strands.

6. The matte film of claim 1, wherein the adhesive layer is formed by spinning an adhesive material of a viscosity suitable for spinning, by an electrospinning method, in which the adhesive material is made of a mixture of an adhesive and a solvent.

7. The matte film of claim 1, wherein the adhesive layer comprises a first adhesive layer formed on the film layer; and a second adhesive layer formed on the first adhesive layer, and wherein the first adhesive layer has a relatively higher viscosity than the second adhesive layer.

8. The matte film of claim 1, further comprising: a non-pore film layer formed between the film layer and the adhesive layer.

9. The matte film of claim 8, wherein the non-pore film layer is formed in a non-porous shape by spinning a polymer material containing PU (Polyurethane) or TPU (Thermoplastic polyurethane).

10. A matte film comprising:
- a film layer that is formed of nano-web of fiber strands made by a spinning method of a polymer material;
- an ink layer that is coated on one surface of the film layer; and
- an adhesive layer that is laminated on the other surface of the film layer through an electrospinning process, wherein the adhesive layer comprises a first adhesive layer formed on the film layer; and a second adhesive layer formed on the first adhesive layer, and wherein the first adhesive layer has a relatively higher viscosity than the second adhesive layer.

11. A matte film comprising:
- a film layer that is formed of nano-web of fiber strands made by a spinning method of a polymer material;
- an ink layer that is coated on one surface of the film layer;
- an adhesive layer that is laminated on the other surface of the film layer through an electrospinning process; and
- a non-pore film layer formed between the film layer and the adhesive layer.

\* \* \* \* \*